UNITED STATES PATENT OFFICE.

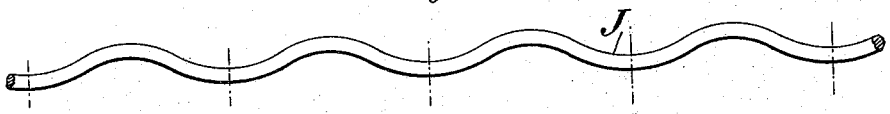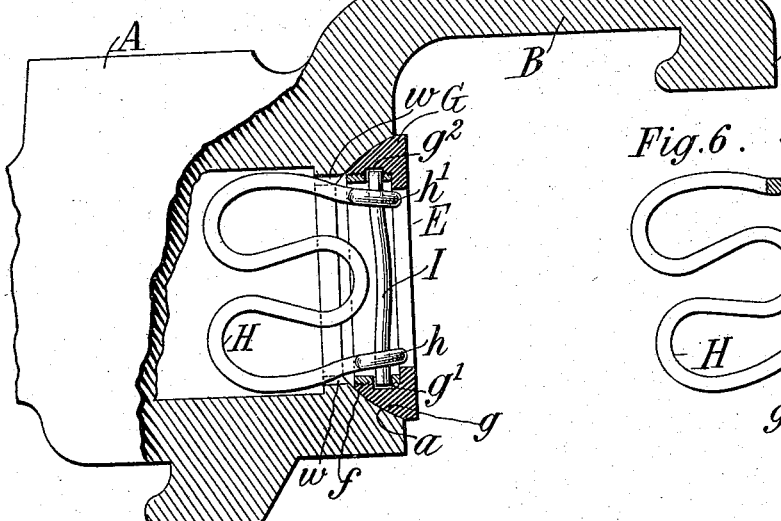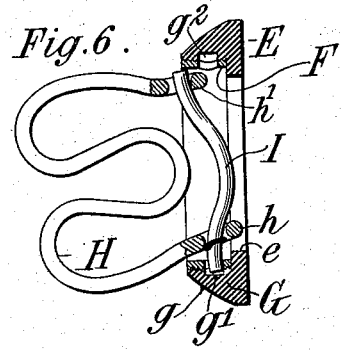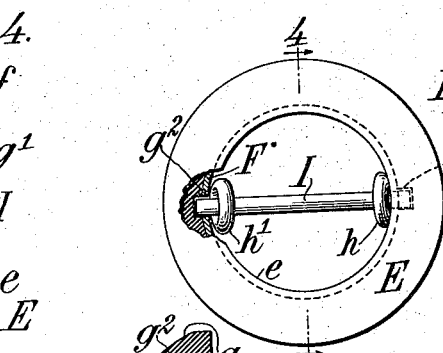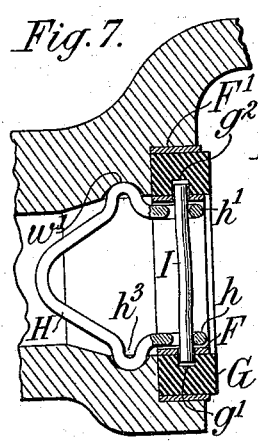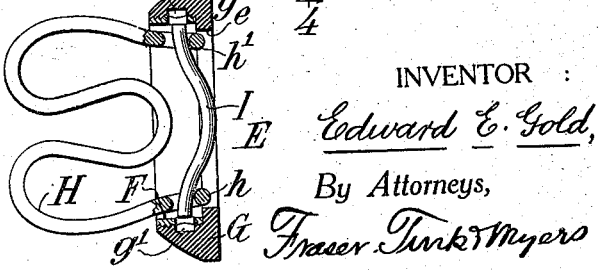

EDWARD E. GOLD, OF NEW YORK, N. Y., ASSIGNOR TO GOLD CAR HEATING & LIGHTING COMPANY, OF NEW YORK, N. Y., A CORPORATION OF NEW YORK.

COUPLING.

1,145,363.  Specification of Letters Patent.  Patented July 6, 1915.

Application filed April 13, 1914. Serial No. 831,369.

*To all whom it may concern:*

Be it known that I, EDWARD E. GOLD, a citizen of the United States of America, residing in the borough of Manhattan, city, county, and State of New York, have invented certain new and useful Improvements in Couplings, of which the following is a specification.

My invention relates to couplings for train-pipe hose, and has for its object to provide improved means for retaining the gaskets or seats of couplers employed for such hose in position.

The invention will be found very useful in connection with oscillating or rocking gaskets such as illustrated in patents No. 475,738, to Balmore and Gold, May 24, 1892, or No. 550,267, to Gold, November 26, 1895, although it is not limited to such oscillating gasket and may be used with a fixed gasket.

The invention consists in the provision of means whereby the gasket-retaining spring is positively held in position and enabled at all times to perform its function of retaining the gasket in position notwithstanding the rough use to which the devices are subjected.

The invention also consists in the method or process by which the gasket is inserted in position.

A desirable embodiment of the invention is illustrated in the accompanying drawings, wherein—

Figure 1 is a plan view principally in section of a coupler head having an oscillating gasket equipped with my invention. Fig. 2 is a detail cross-section of a gasket illustrating a method of assembling the parts. Fig. 3 illustrates a plan view of the gasket with the retaining spring and holder in place. Fig. 4 is a cross-section on the line 4—4, Fig. 3. Fig. 5 illustrates the wire from which the retaining spring supports are cut. Fig. 6 illustrates a modified method of assembling the parts. Fig. 7 illustrates a longitudinal section of a coupler head showing my invention as applied to a fixed gasket.

My invention is illustrated in connection with a direct port coupler of the familiar Gold type wherein the coupler heads are formed in two counterparts which interlock. But one of the said coupler heads is illustrated, and this comprises a body A having an extended arm B which is provided with a flange C that engages over a flange on the mating coupler head corresponding to the flange D on the body A. The gasket or seat E is formed as usual and is usually composed partly of metal and partly of compressible material which is frequently made of some asbestos composition suitable for the purpose.

According to my invention a spring H is provided for the purpose of retaining the gasket in position, which is preferably made of wire. This spring is freely mounted upon a rod I so as to permit the spring to contract on insertion into the coupler. This rod is diametrically arranged with respect to the gasket and its ends are located within recesses $g^1$, $g^2$ therein. The body of the spring extends within the bore of the coupler and is bulged outward so that the spring will compress on insertion and that when inserted these bulged portions will expand into recesses in the coupler and hold the spring and the gasket in position by contact of the spring with the shoulder forming the front wall of the said recess.

The invention is applicable to use with either the fixed gasket of Fig. 7, wherein the gasket is formed of the usual body G with inner frame F and outer frame F' or with the rocking gasket of Fig. 1 wherein an inner frame F is usually provided for the body G of the gasket which has a spherical exterior portion $g$ which fits within a corresponding recess $a$ at the end of the bore of the coupler (Fig. 1), and provides means by which the gasket may rock or oscillate so that a tight joint shall be assured, notwithstanding the mating parts of the coupler are not axially alined.

I prefer to vary somewhat the shape of the spring H for the fixed and oscillating gaskets. For the fixed gasket this spring may have substantially the V shape illustrated in Fig. 7 where its diverging walls are provided with outward bends $h^3$ which pass behind the shoulder formed by annular groove $w'$ in the bore of the coupler and hold the gasket firmly in position.

For the oscillating gasket of Fig. 1, I prefer a spring having a W shape such as shown in Fig. 1. A spring of this character is illustrated in my Patent, No. 550,267, wherein the ends of the spring were bent and inserted in the gasket body. Difficulty was experienced in the use of this type of gasket retainer due to the fact that a blow upon the gasket which is very apt to take place in coupling by hitting the end of the arm against the gasket, will cause the gasket to rock sidewise, or in different direction from the rocking which occurs in use. This will compress the spring against the shoulder of the coupler head and pull the end of the spring out of the hole in the gasket. The end of the spring will then rest against the plane side of the gasket and when next coupled will probably be dislodged permitting the gasket to drop out. The present improvement, therefore, has reference to means whereby the gasket-retaining spring member at all times will be held positively in position, notwithstanding rough or careless handling, and in carrying the same into effect I mount the ends of the spring upon the support or rod I and I prefer to so mount them that the spring may slide on the rod. The preferred mounting is by having the rod pass through eyes $h$ $h^1$ formed at each end of the spring H. The rod I is located diametrically of the gasket and its ends are secured as by being received in openings $g^1$ $g^2$ in the gasket, which openings are oppositely disposed so that the said rod shall extend across the diameter of the core of the gasket. These openings are in line with similar openings in the ring F through which the rod passes. Thereby I provide positive and reliable means for holding the spring H in position, for it will be seen that the eyes $h$ $h^1$ are situated near the ends of the rod I and that a blow upon the gasket will not have the effect of dislodging its supporting rod. In use if the gasket is rocked from any cause the spring will ride on the supporting rod and will not be dislodged, nor will a blow upon the spring or rod be apt to dislodge the same.

The manner of assembling the parts I believe to be novel. The springs H may well be cut from the continuous wire J of Fig. 5. A curved section thereof will be passed through the eyes $h$ $h^1$ of the spring and inserted in the opening in the gasket so that its ends register with the openings $g^1$ $g^2$ in the gasket as in Fig. 2. The parts may be assembled in a holder or form if desired. Thereupon pressure from a press or a blow from a suitable tool will straighten out the rod and force its ends into the holes in the gasket. If desired, one end of the said rod I may be inserted in one of the holes $g^1$ $g^2$ as indicated in Fig. 6, so that the opposite end registers with the opposite hole, whereupon the ends of the spring H may be supported upon a block and the rod straightened out with a press or suitable tool, forcing the opposite end into the opposite hole where it will remain and effectually support the spring.
As illustrated in Fig. 4 the ring F is preferably roughened on its interior surface at $f$ to secure a firm adhesion of the body E of the gasket. The body E of the gasket overhangs the said ring slightly at $e$, providing a flange or ledge which both increases the seating surface and to an extent protects the adjacent parts from injury.

The accompanying drawing illustrates the most advantageous manner of constructing my invention known to me. The same may be modified and equivalent devices employed if desired within the limits of the appended claims. The said gasket and its retaining spring are sold as articles of commerce in assembled form for application to any desired coupler.

A desirable feature of the gasket-retaining device herein illustrated in connection with the oscillating gasket is in the fact that when it is used it is not necessary that the gasket should be put in so that it shall lie in a certain position, as is the case with the ordinary W-gasket of my patent referred to. In the present improvement the gasket may be inserted in any position with relation to the direction of oscillation of the coupler without liability of its becoming dislodged.

I claim as my invention:—

1. In a hose coupler having locking devices, and a spherical recess receiving an annular gasket having universal motion, means for retaining said gasket in place, comprising a rod having its ends inserted in said gasket, a separate spring mounted on said rod and having a free end extending in the bore of said coupler and engaging behind a shoulder in said bore.

2. Retaining devices for a hose coupler gasket having a core comprising a rod having its ends anchored in the opposite walls of the gasket and extending across the bore of the coupler, and a spring carried thereby and having a free end adapted to extend in the coupler and to engage behind opposite walls of a shoulder in the bore thereof.

3. Retaining devices for a hose coupler gasket having a core comprising a rod having its ends anchored in the opposite walls of the gasket and extending across the bore of the coupler, and a wire spring having its respective ends bent around said rod and having a free end adapted to extend in the coupler and to engage behind opposite walls of a shoulder in the bore thereof.

4. A hose coupler gasket consisting of an inner metal ring and a seat of compressible material secured thereto, and means for retaining said gasket in place, comprising a rod extending substantially diametrically from side to side of said gasket and entering said ring of a wire spring having its respective ends bent around said rod and having a free end adapted to extend in the coupler and to engage behind opposite walls of a shoulder in the bore thereof.

5. A hose coupler gasket consisting of an inner metal ring and a seat of compressible material secured thereto, and means for retaining said gasket in place comprising a rod extending across said gasket and entering said ring, and a separate wire spring substantially in the shape of a W, having its two ends looped around said rod, and adapted to extend in the coupler and to engage behind opposite walls of a shoulder in the bore thereof.

6. The method of assembling gasket and gasket-retaining devices which consists in providing a gasket with oppositely disposed recesses, in looping a spring over a bent rod and inserting an end of said rod in one of said recesses, and in straightening said rod whereby its opposite end is forced into the other recess and the said spring is securely held.

7. The method of assembling gasket and gasket-retaining devices which consists in providing a gasket with oppositely disposed recesses, in looping a spring over a bent rod and in locating said assembled rod and spring in line with said recesses, and in straightening said rod whereby it is forced into the said recesses and the said spring is securely held.

8. In a hose coupler having mating heads and locking devices, gaskets for said heads and means for retaining said gaskets in place comprising a rod having its ends inserted in said gasket and extending across the bore of the coupler, a wire spring having its ends bent around said rod and having its body extend into the bore of the coupler, and having outwardly bulged portions in said body adapted to be compressed on the insertion of said spring, and said bore provided with enlarged portions into which said spring body may expand when so inserted.

9. A hose coupler gasket and retaining devices therefor comprising a rod having its ends anchored therein, a separate spring having its ends secured to said rod and having a body adapted to extend into a coupler and outward bulges in said body.

10. A hose coupler gasket and retaining devices therefor comprising a rod extending across a bore of the coupler and having its ends anchored therein, a separate wire spring having both its ends bent around said rod near its ends and having its body adapted to extend into a coupler bore, and having outward bulges in each side of said body adapted to engage into a recess in said bore.

11. A gasket, a rod extending diametrically thereof and having its ends secured to the gasket, and a separate spring mounted on said rod and having its ends adapted to slide freely thereon.

12. A gasket, a rod extending diametrically thereof and having its ends secured thereto, a separate spring having its ends bent around the said rod near the gasket and adapted to slide freely thereon.

In witness whereof, I have hereunto signed my name in the presence of two subscribing witnesses.

EDWARD E. GOLD.

Witnesses:
THOMAS F. WALLACE,
FRED WHITE.